United States Patent [19]

Apps et al.

[11] Patent Number: 5,285,899
[45] Date of Patent: * Feb. 15, 1994

[54] STACKABLE CAN TRAY SYSTEMS

[75] Inventors: William Apps, Anaheim; Arne Lang-Ree, Manhattan Beach, both of Calif.

[73] Assignee: Rehrig-Pacific Company, Inc., Los Angeles, Calif.

[*] Notice: The portion of the term of this patent subsequent to Jun. 12, 2007 has been disclaimed.

[21] Appl. No.: 724,189

[22] Filed: Jul. 1, 1991

Related U.S. Application Data

[60] Division of Ser. No. 708,831, May 29, 1991, which is a continuation of Ser. No. 504,399, Apr. 3, 1990, abandoned, which is a division of Ser. No. 272,039, Nov. 15, 1988, Pat. No. 4,932,532.

[51] Int. Cl.$^5$ .................. B65D 21/02; B65D 1/24
[52] U.S. Cl. .................... 206/503; 206/509; 206/427; 220/509; 220/516; 220/519
[58] Field of Search ........... 206/503, 509, 427, 508; 220/509, 516, 519

[56] References Cited

U.S. PATENT DOCUMENTS

| | | | |
|---|---|---|---|
| D. 244,486 | 5/1977 | Johnson et al. | D87/1 R |
| D. 247,652 | 3/1978 | Corroll et al. | D87/1 R |
| D. 284,841 | 7/1986 | Rowland et al. | D9/456 |
| D. 291,178 | 8/1987 | Toms | D9/345 |
| 2,907,509 | 10/1959 | Chamberlin | 229/15 |
| 2,970,715 | 2/1961 | Kappel et al. | 220/21 |
| 2,979,222 | 4/1961 | Levine | 220/21 |
| 3,009,579 | 11/1961 | Ettlinger, Jr. | 211/71 |
| 3,092,284 | 6/1963 | Stout | 220/21 |
| 3,106,308 | 10/1963 | Kazimier | 220/21 |
| 3,148,797 | 9/1964 | Cloyd | 220/21 |
| 3,155,268 | 11/1964 | Fogerty et al. | 220/21 |
| 3,250,564 | 5/1966 | Stern et al. | 294/87.2 |
| 3,332,574 | 7/1967 | Earp | 220/97 |
| 3,333,727 | 8/1967 | Belcher et al. | 220/97 |
| 3,334,767 | 8/1967 | Cornelius et al. | 220/21 |
| 3,347,405 | 10/1967 | Motsenbocker et al. | 220/21 |
| 3,349,943 | 10/1967 | Box | 220/21 |
| 3,369,659 | 2/1968 | Ettlinger, Jr. | 206/72 |
| 3,391,814 | 7/1968 | Box | 220/21 |
| 3,391,815 | 7/1968 | Box | 220/21 |
| 3,392,869 | 7/1968 | Needt | 220/21 |
| 3,421,649 | 1/1969 | Waller | 220/4 |
| 3,428,207 | 2/1969 | Schoeller | 220/21 |
| 3,517,852 | 6/1970 | Schoeller | 220/21 |
| 3,568,879 | 3/1971 | Box | 220/97 |
| 3,651,976 | 3/1972 | Chadbourne . | |
| 3,756,429 | 9/1973 | Fleischer et al. | 214/10.5 R |
| 3,949,876 | 4/1976 | Bridges et al. | 206/427 |

(List continued on next page.)

FOREIGN PATENT DOCUMENTS

| | | |
|---|---|---|
| 1351218 | 12/1963 | France . |
| 1474782 | 3/1967 | France . |
| WO91/17097 | 11/1991 | PCT Int'l Appl. . |
| 568191 | 10/1975 | Switzerland . |
| 1115343 | 5/1968 | United Kingdom . |
| 1152038 | 6/1969 | United Kingdom . |
| 1182452 | 2/1970 | United Kingdom . |
| 2032886A | 11/1978 | United Kingdom . |
| 2220196A | 6/1989 | United Kingdom . |

Primary Examiner—Joseph Man-Fu Moy
Attorney, Agent, or Firm—Banner, Birch, McKie & Beckett

[57] ABSTRACT

A stackable can tray system including a bottom tray loaded with a layer of cans each having a top rim, an upper tray having a plurality of spaced members depending down from a bottom floor surface of the tray, and a layer of cans in the upper tray. With the upper tray in a normal stacked position on the bottom layer of cans, the spaced members engage relative to the top rims of the cans and thereby block substantial movement of the tray and hold it in a secure position. A generally lateral force applied to the upper tray repositions the spaced members such that the upper tray filled with the layer of cans has its spaced members on the top rims of the cans and it can be slidingly pulled on top of the layer of cans in the bottom tray beneath it, and thereby unstacked.

46 Claims, 7 Drawing Sheets

U.S. PATENT DOCUMENTS

| | | | |
|---|---|---|---|
| 3,982,654 | 9/1976 | Gottsegen | 220/21 |
| 4,040,517 | 8/1977 | Torokvei | 206/144 |
| 4,095,720 | 6/1978 | Delbrouck et al. | 220/21 |
| 4,155,451 | 5/1979 | Miller | 206/503 |
| 4,161,259 | 7/1979 | Palafox | 220/21 |
| 4,162,738 | 7/1979 | Wright | 220/21 |
| 4,195,746 | 4/1980 | Cottrell | 220/4 E |
| 4,249,671 | 2/1981 | Crolli | 220/469 |
| 4,342,388 | 8/1982 | Torokvei | 206/203 |
| 4,342,403 | 8/1982 | Badtke et al. | 220/345 |
| 4,344,530 | 8/1982 | De Larosiere | 206/203 |
| 4,410,099 | 10/1983 | De Larosiere | 220/21 |
| 4,538,742 | 9/1985 | Prodel . | |
| 4,548,320 | 10/1985 | Box . | |
| 4,615,444 | 10/1986 | De Larosiere | 206/427 |
| 4,700,837 | 10/1987 | Hammett | 206/427 |
| 4,789,063 | 12/1988 | Hammett | 206/432 |
| 4,834,243 | 5/1989 | Langenbeck | 206/557 |
| 4,872,560 | 10/1989 | Langenbeck | 206/557 |
| 4,896,774 | 1/1990 | Hammett et al. | 206/516 |
| 4,928,841 | 5/1990 | Arthurs . | |
| 4,932,532 | 6/1990 | Apps et al. | 206/503 |
| 4,944,400 | 7/1990 | Van Onstein et al. . | |
| 5,009,053 | 4/1991 | Langenbeck et al. | 53/58 |
| 5,031,774 | 7/1991 | Morris et al. . | |

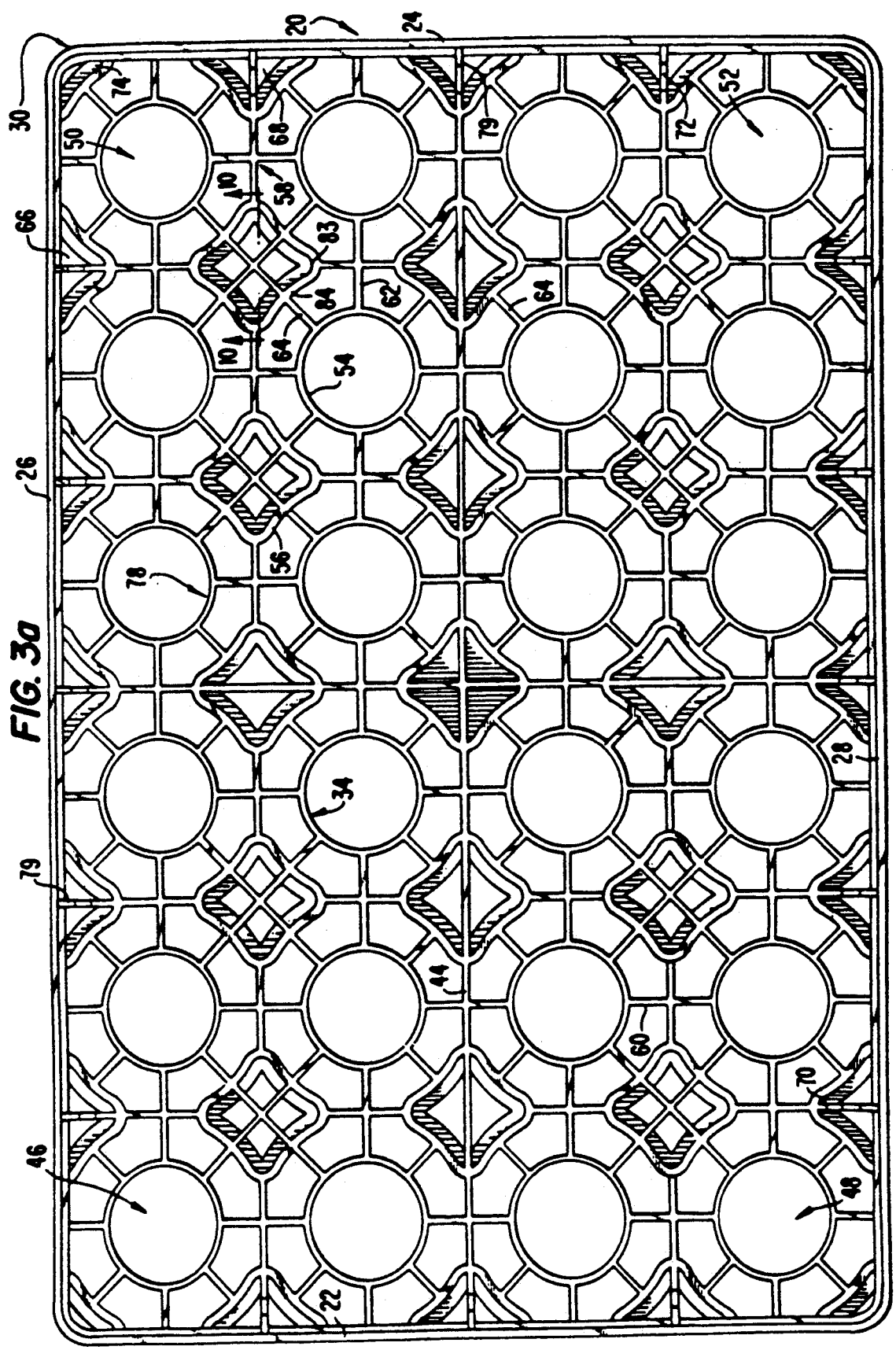

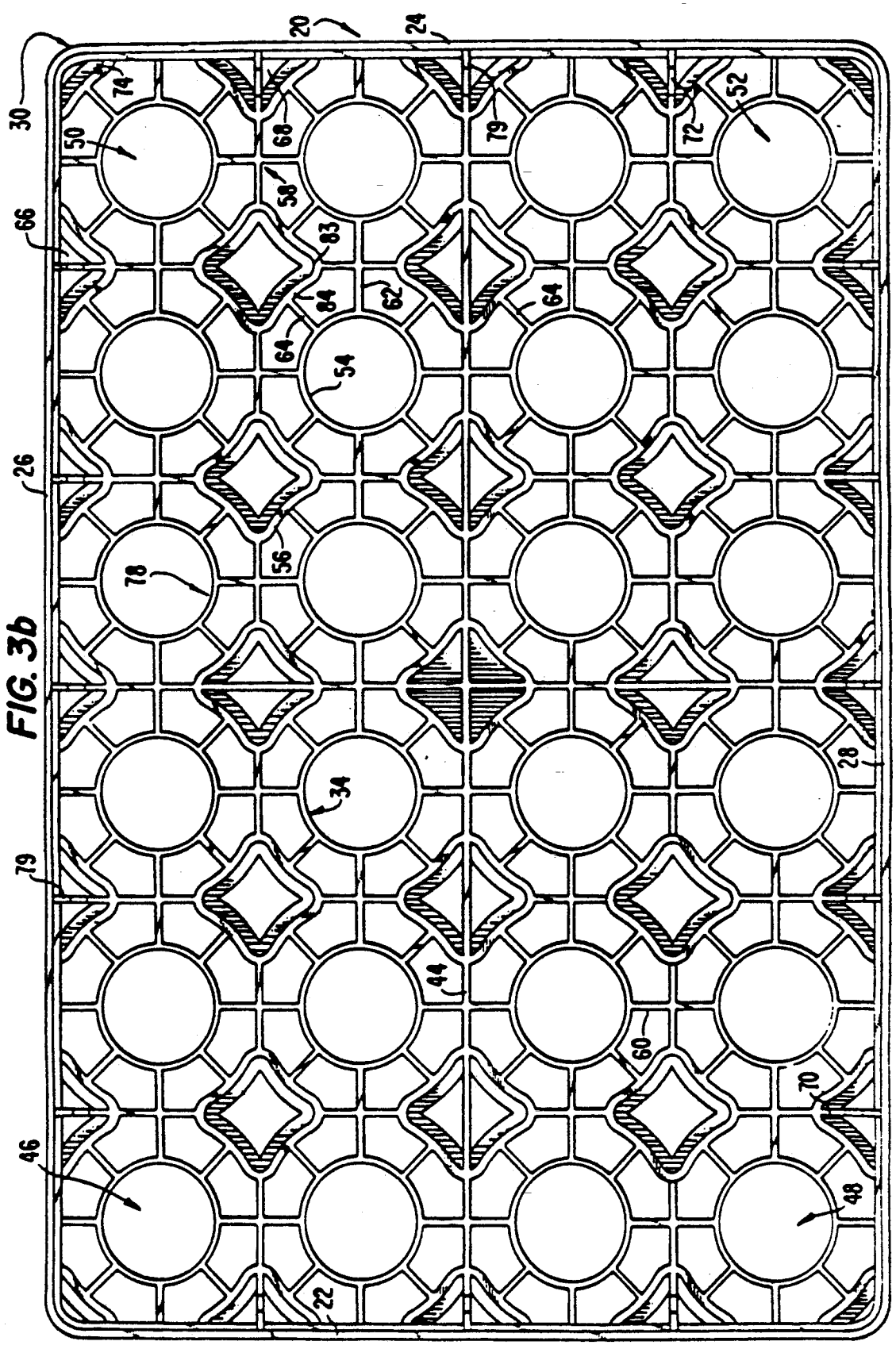

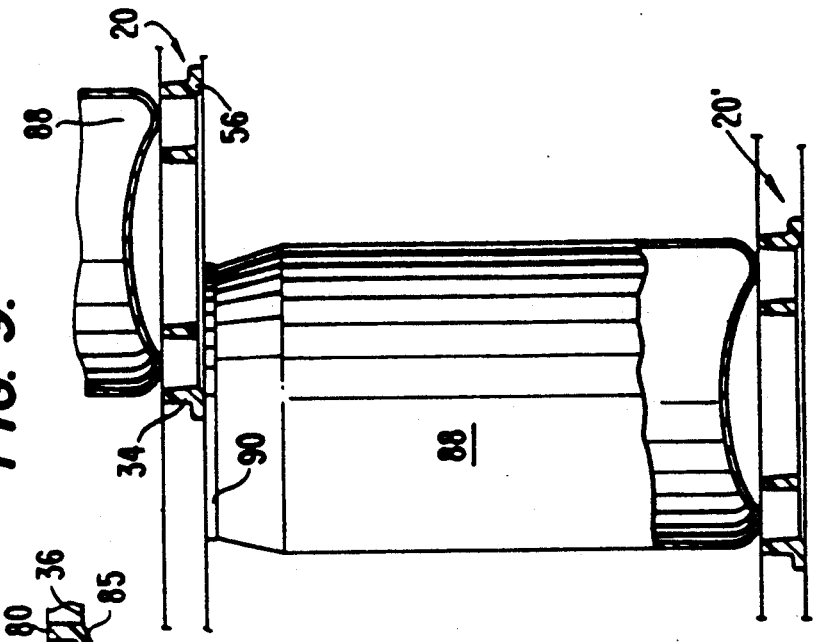
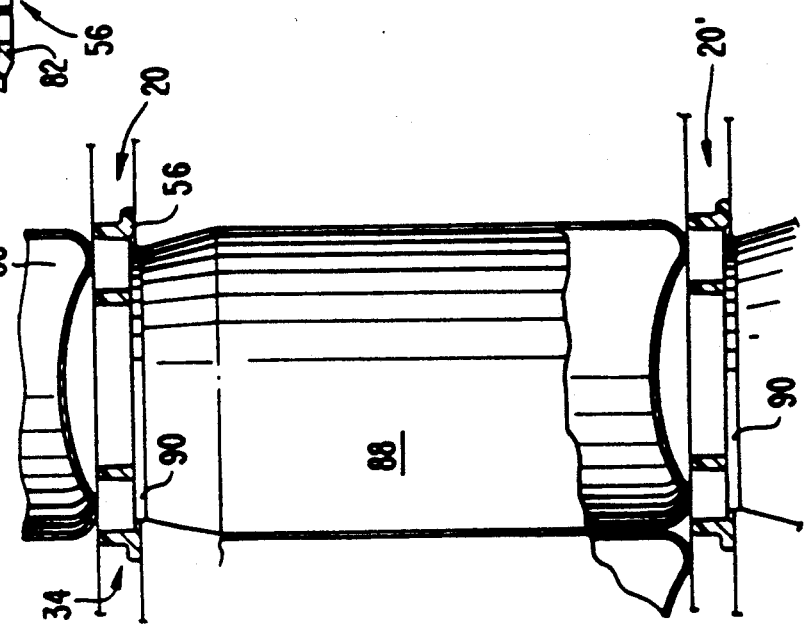
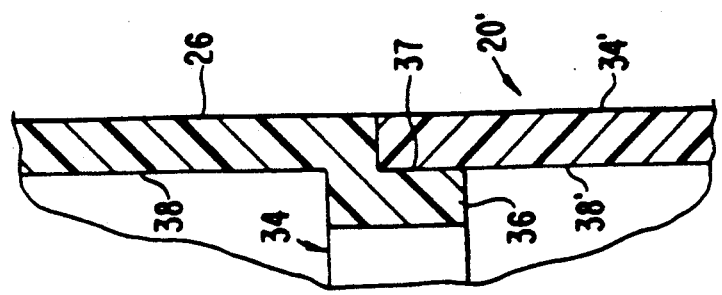

STACKABLE CAN TRAY SYSTEMS

This application is a division of application Ser. No. 07/708,831 filed May 29, 1991, which is a continuation of Ser. No. 07/504,399, filed Apr. 3, 1990, now abandoned, which is a division of Ser. No. 07/272,039 filed Nov. 15, 1988, now U.S. Pat. No. 4,932,532.

BACKGROUND OF THE INVENTION

The present invention relates to trays for transporting and storing containers such as beverage containers, and more particularly for those storing two or more six-packs of pull-top aluminum cans. It further relates to such trays which can be securely stacked one on top of another both when full and when empty.

Pull-top aluminum cans for soft drinks, other beverages and the like are stored and transported during the distribution stage typically in short-walled cardboard trays or in cardboard boxes. On the other hand as to bottles, because of the ever increasing cost in disposable tertiary packaging, returnable, reusable containers are becoming popular for the storage and handling of bottles. However, unlike plastic or glass bottles which have rounded edges on their crown or top, pull-top aluminum cans have square sharp corners (as compared with bottle tops) where the top of the can attaches to the sides thereof. Therefore, particular difficulties have been encountered in the stacking and manipulating of the trays of cans stacked relative to one another. In fact, there are no known returnable, reusable trays suitable for supporting pull-top aluminum cans and which can, when filled with such cans, be stacked securely one on top of another, so that the top tray of a stack of filled trays can be easily pulled off and along the stack without being lifted. In other words, the trays should be constructed so that when loaded they can be easily pivoted and slid off of loaded trays beneath them without having to be lifted.

SUMMARY OF THE INVENTION

Accordingly, it is a principal object of the present invention to provide a returnable and reusable tray for storing and transporting cans.

It is a further object of the present invention to provide a returnable plastic tray adapted to accommodate and support therein twenty-four twelve ounce pull-top aluminum cans.

It is a still further object of the present invention to provide a returnable tray, particularly adapted for cans having square sharp top corners, which when full can be pulled and pivoted, without being lifted, on and along a top surface of another layer of such cans.

Another object of the present invention is to provide a novel, sturdy, reusable tray for storing and handling containers, and such tray having a webbed floor design which is interesting and aesthetically pleasing.

A further object of the present invention is to provide a sturdy reusable tray for supporting, storing and transporting beverage containers which tray is lightweight and thus can be easily manipulated and carried, and which can also be economically constructed.

Directed to achieving these objects, a unique stackable, reusable tray especially designed for stacking and storing cans having sharp top edges is provided herein. This stackable tray is formed by pairs of side walls and end walls integrally joined at their edges to define a rectangular structure. A floor structure is secured to and positioned generally within the rectangular structure. The floor structure is adapted for supporting thereon a plurality of cans positioned within the rectangular structure, and in a preferred embodiment is adapted to accommodate four six-packs (six containers in an interconnected two-by-three array) thereon. The floor structure is configured to define a web having a plurality of spaced, generally circularly-shaped members positioned in longitudinal and lateral rows. Redoubt members are spaced and positioned in the middle of these circularly-shaped members and are connected thereto and therebetween by a plurality of struts. The spaced redoubt members have the bottom surfaces thereof extending below the rest of the floor structure a slight distance. The redoubt members further have their bottom perimeters defining edges bevelled at an angle of approximately twenty-five degrees plus or minus five degrees relative to the rest of the floor structure. The bottom surfaces of the redoubt members thereby are configured so that a full tray can be easily slid and pivoted on the top of a layer of aluminum cans directly beneath it.

In other words, a reusable stackable tray for cans formed by a rectangular wall structure, a web-like floor structure secured to and extending down from the wall structure and a plurality of spaced redoubt floor members spaced on and about and extending down from the bottom surface of the floor structure is herein provided. Each of the redoubt floor members has a bevelled bottom edge perimeter such that a tray filled with cans can, without being lifted, be slidingly pulled and pivoted on the redoubt floor members directly on top of a layer of cans in another tray beneath it.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 3a is a top plan view of the tray of FIG. 1.

FIG. 3b is a view similar to that of FIG. 3a illustrating a variation on the design of the tray of FIG. 1.

FIG. 7 is a fragmentary cross-sectional view of a side (or end) of a pair of empty trays of FIG. 1 showing their interlocking nesting arrangement.

FIG. 8 is a cross-sectional view of a portion of the tray of FIG. 1 when loaded, locked and supported on a similar said loaded tray.

FIG. 9 is a view similar to that of FIG. 8 showing the trays thereof in a lock broken and sliding relation.

FIG. 10 is an enlarged cross-sectional view taken along line 10—10 in FIG. 3a.

DETAILED DESCRIPTION OF PREFERRED EMBODIMENTS OF THE INVENTION

Figure 1:
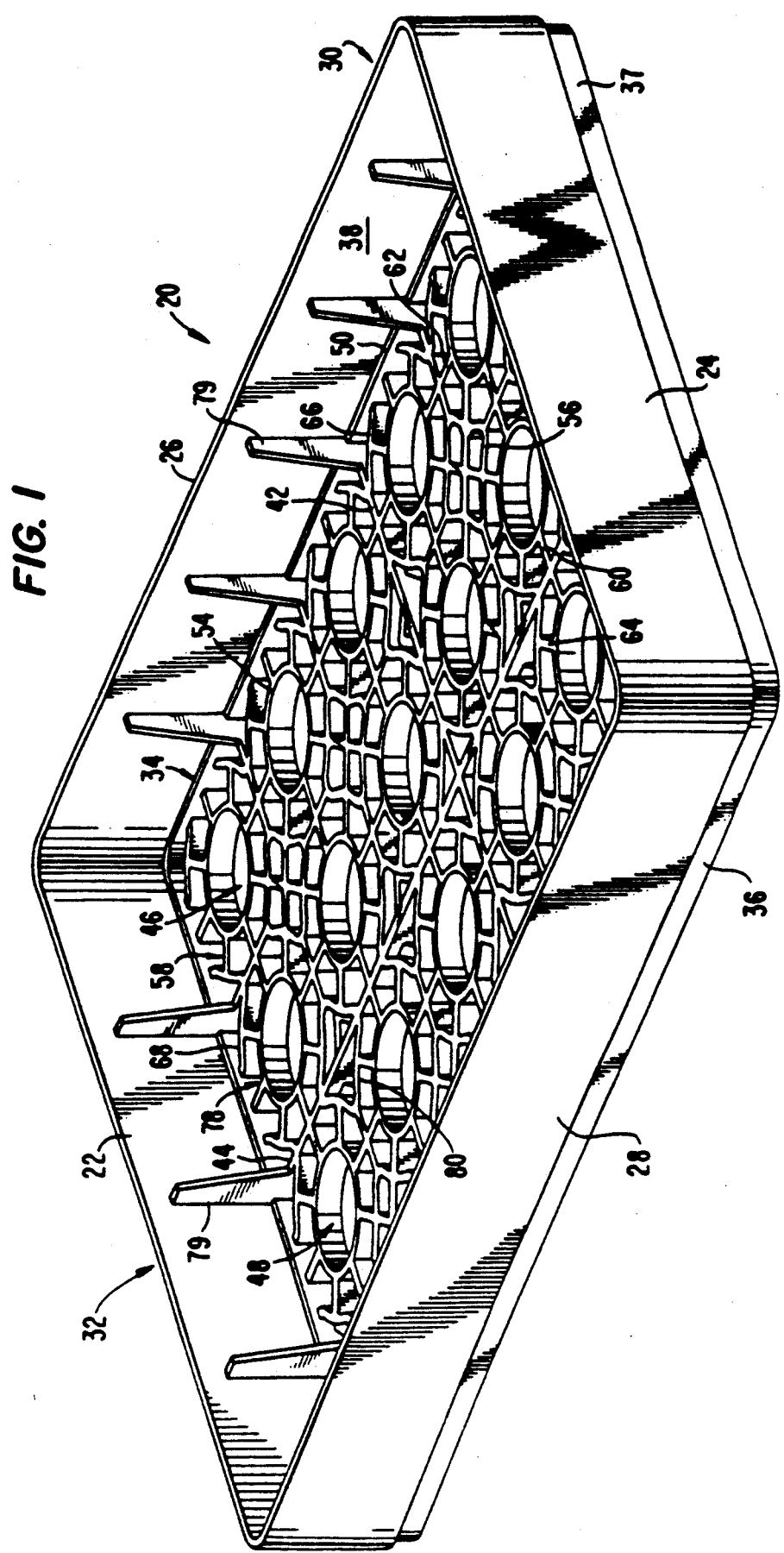
FIG. 1 is a top perspective view of a reusable stackable tray for cans of the present invention.
Figure 2:
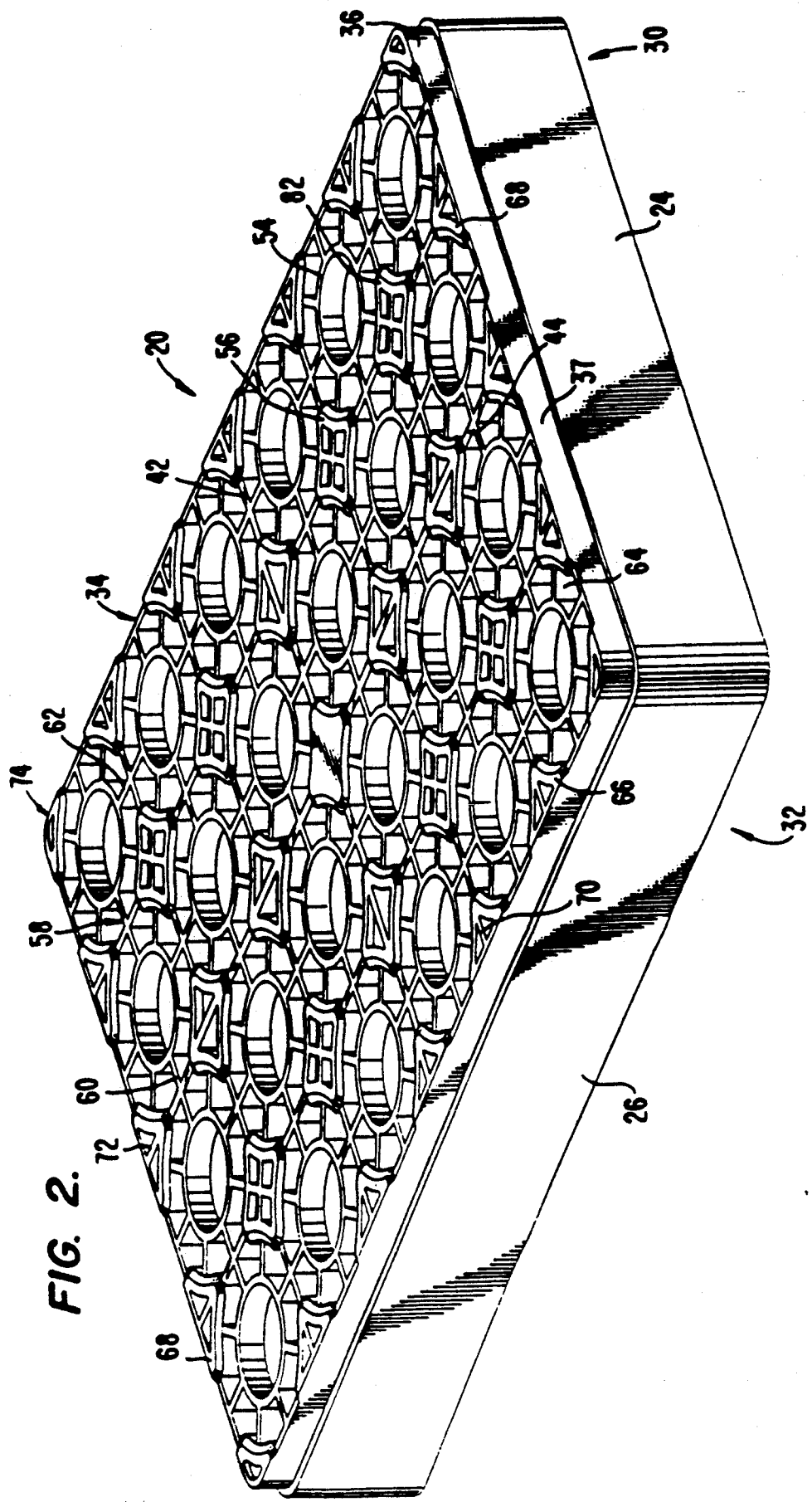
FIG. 2 is a perspective view of the tray of FIG. 1 when upside down.
Figure 4:
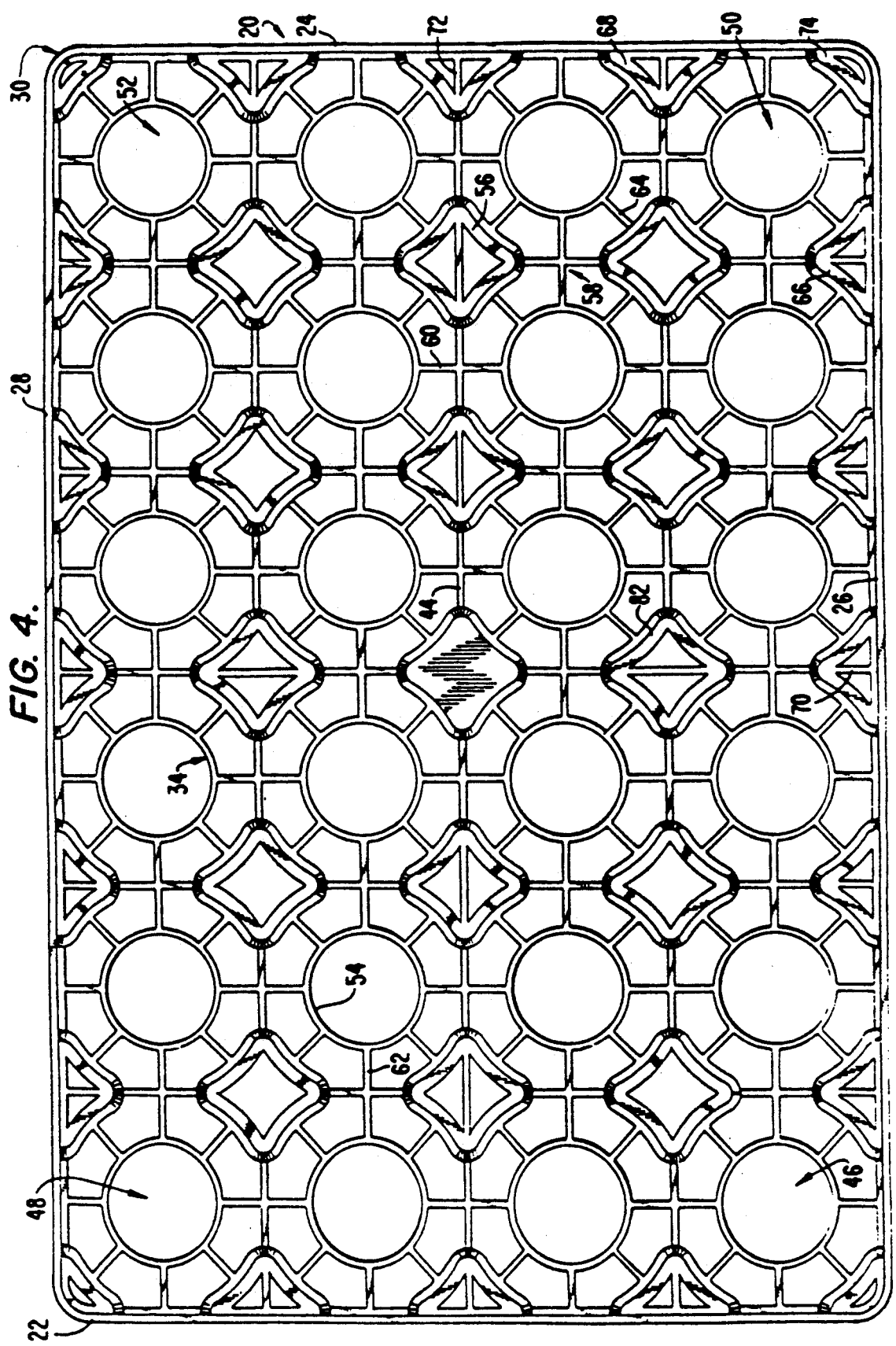
FIG. 4 is a bottom plan view of the tray of FIG. 1.

Referring to the drawings a reusable, stackable tray for cans is illustrated generally at 20, and is formed by a unitary integral plastic construction. It comprises a pair of end walls 22, 24, and a pair of opposed side walls 26, 28 wherein the end and side walls are integrally joined to form four rounded corners as shown for example at 30. As seen, the end and side walls 22, 24, 26, 28 form a rectangular structure shown generally at 32. A floor structure designated generally by reference numeral 34 is positioned within and secured to the base of the rectangular structure 32. The perimeter structure 36 of the floor structure 34 has its outer surfaces 37 spaced inward about the entire perimeter thereof inside of the inside surface 38 of the rectangular structure 34 to thereby provide a stepped-in design. This allows one tray 20 to be stacked and nested securely, but removably, within another similar or identical empty tray 20' and thereby resist relative lateral movement as to the surface 38' of the rectangular structure 34'. This nesting relation is best illustrated in FIG. 7.

The floor structure 34, as seen in the drawings, defines a web-like construction which minimizes the use of the plastic material thereby making the tray 20 lighter and easier to handle and also reducing the amount of the plastic construction material required. It further presents a pleasing and interesting design. The central dividing struts 42, 44 thereof extending, respectively, between the centers of the opposed side walls 26, 28 and the centers of the opposed end walls 22, 24 divide the floor structure 34 into four equal cells shown generally at 46, 48, 50 and 52, and aid in manufacturing by providing flow channels for the plastic material from the point of injection at the part center to the walls. Each cell then represents the storage space for an interconnected six-pack of beverage cans, and includes six spaced circular members such as shown by 54 in two-by-three arrays. Spaced redoubt members such as shown by 56 are positioned in the middle of four adjacent circular members 54. A plurality of struts such as shown generally at 58 then interconnects the circular members 54, the redoubt members 56, and the floor perimeter structure 36.

The struts 58 comprise lateral struts such as shown by 60 which directly connect laterally adjacent circular members 54, longitudinal struts such as shown at 62 which directly connect longitudinally adjacent circular members 54, and radial struts such as shown at 64 which directly connect the sides of the redoubt members 56 to the circular members 54. For the redoubt members 56 positioned within the cells 46, 48, 50 or 52, radial struts 64 extend therethrough, as shown in FIG. 3a, for example. In another and perhaps more preferred design, the radial struts 64 do not extend through the redoubt members, as illustrated in FIG. 3b. Similarly, the dividing struts 42, 44 extend through the redoubt members 56 positioned between adjacent cells 46, 48, 50 or 52.

Figure 5:
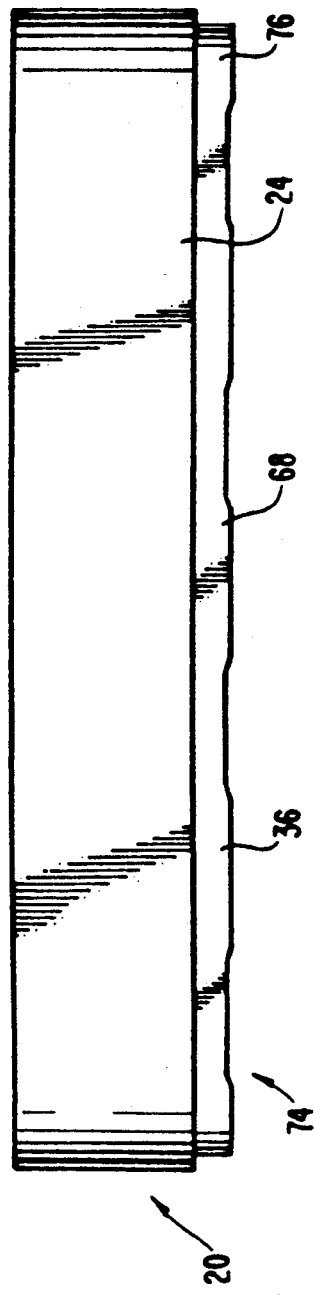
FIG. 5 is an end elevational view of the tray of FIG. 1.
Figure 6:
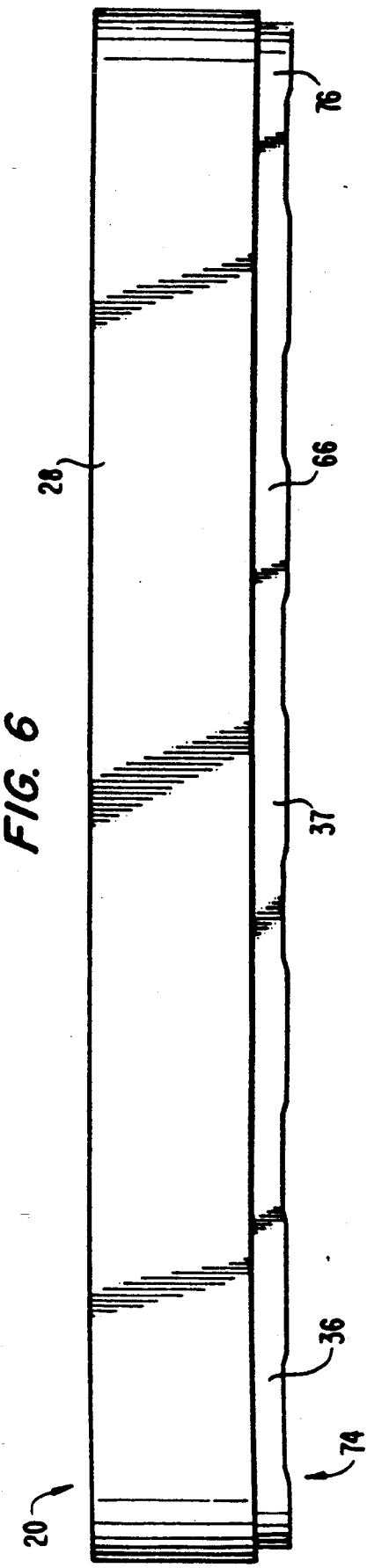
FIG. 6 is a side elevational view of the tray of FIG. 1.

Partial side and end engaging redoubt members such as shown at 66, 68, respectively, are positioned spaced along the floor perimeter structure 34, and are shown in elevation in FIGS. 5 and 6. These partial side and end engaging redoubt members 66, 68 have lateral or longitudinal redoubt struts 70, 72, respectively, extending through them as shown. Additionally, the corners such is shown at 74 of the floor perimeter structure 34 are rounded and have corner engaging redoubt members thereat such as shown at 76.

The tops of each of the struts 58, redoubt members 56, and circular members 54 all have their upper surfaces defining a smooth upper plane illustrated generally at 78 on which beverage cans can be positioned, supported and easily slid along without obstruction for inserting the cans into the tray 20 and removing them from it. A plurality of spaced reinforcing posts such as shown at 79, interconnect the floor structure 34 with the rectangular structure 32 by engaging the tops of adjacent lateral or longitudinal struts 60, 62 and extending up and secured to the inside surface 38 of the rectangular structure 32.

The redoubt members 56 are each formed by a continuous upright wall 80 and a redoubt floor 82 secured at the bottom end thereof, as best shown in FIG. 10. The redoubt walls 80 are configured in a square-like shape having rounded corners 83 and with the middles 84 of each of the sides thereof (where the radial struts 64 engage) being curved inwardly a slight amount. The bottom surfaces of the redoubt walls 81 lie generally in the plane of the bottom surfaces of the struts 58, the floor perimeter structure 36 and the circular members 54. The redoubt floor 82, however, extends below that plane. The redoubt floor 82 has about its entire bottom perimeter a bevelled edge 85 which is formed at an angle 86 of, for example, twenty-five degrees plus or minus five degrees relative to the bottom plane of the rest of the floor structure 36. This angle is appropriate for the current material and market can design. However, this angle would be adjusted as needed to accommodate different materials and can designs.

These small, permanent, spaced redoubt members 56 assist the trays 20 when full to stack securely upon layers of cans 88 beneath them, as shown in FIG. 8. The cans 88 are those such as described earlier herein and have square sharp top corners 90. They also allow the tray 20 to be twisted or pivoted slightly while stacked on a similar layer of cans 88 therebeneath and then slid easily off of the loaded tray beneath it. This motion is best illustrated in FIG. 9. This allows a delivery driver, for example, to pull off the top tray 20 of any tall stack without having to lift that top tray. In other words, a loaded tray 20 can be easily slid off the loaded tray directly beneath it. These redoubt members 56 are also spaced evenly relative to one another to conform to a twenty-four can configuration. It is also within the scope of this invention for tray 20 to be configured and proportioned differently as needed to accommodate different numbers, sizes and arrangements of containers.

From the foregoing detailed description, it will be evident that there are a number of changes, adaptations, and modifications of the present invention which come within the province of those skilled in the art. However, it is intended that all such variations not departing from the spirit of the invention be considered as within the scope thereof as limited solely by the claims appended hereto.

What is claimed is:

1. A can tray system including (a) a bottom layer of cans, each said can having an upwardly disposed, generally circular top rim, (b) a tray having walls joined together to thereby define a generally rectangular wall structure, said tray including a floor structure secured to and positioned generally within said wall structure, said floor structure having a bottom floor surface and a top floor surface, said tray being supported at least in part by said bottom layer of cans, and (c) a top layer of cans supported on said top floor surface, each said can of said top layer having an upwardly disposed generally circular top rim; wherein the improvement comprises:

said tray having a plurality of spaced members depending down from said bottom floor surface and positioned relative to said top rims of said bottom layer of cans such that said tray is normally positioned in a blocked position on top of said rims of said bottom layer of cans such that free sliding motion of said tray on said bottom layer of cans is blocked;

wherein when a generally lateral force is exerted on said wall structure, at least some of said spaced members are repositioned relative to said top rims of said bottom layer such that said tray is in a generally unblocked position relative thereto and said tray can slide on said rims of said bottom layer of cans.

2. The can tray system of claim 1 wherein said floor structure further comprises a plurality of spaced, generally circularly-shaped members, and strut means.

3. The can tray system of claim 2 wherein each of said layers of cans include four six-packs of cans, and said circularly-shaped members form a four-by-six array generally corresponding to said four six-packs of cans.

4. The can tray system of claim 2 wherein said floor structure has an open gridwork construction.

5. The can tray system of claim 2 wherein said plurality of spaced, generally circularly-shaped members are positioned in longitudinal and lateral rows and thereby define four corners of a plurality of parallelograms.

6. The can tray system of claim 5 wherein said plurality of spaced members includes fifteen spaced members disposed in the centers of said plurality of parallelograms.

7. The can tray system of claim 5 wherein said strut means includes, for each of said parallelograms, a plurality of first struts extending longitudinally and interconnecting said circularly-shaped members which are longitudinally adjacent and extending laterally and interconnecting said circularly-shaped members which are laterally adjacent.

8. The can tray system of claim 7 wherein said strut means further includes, for each of said parallelograms, a plurality of second struts extending radially and interconnecting each of said corner circularly-shaped members and said spaced members within said parallelograms.

9. The can tray system of claim 8 wherein said strut means further includes, for each of said parallelograms, a plurality of third struts extending longitudinally and laterally and interconnecting said spaced members which are longitudinally and laterally adjacent, respectively.

10. The can tray system of claim 2 wherein said strut means includes, for each of said parallelograms, diagonally-disposed radial struts directly connecting each of said circularly-shaped members defining the four corners of each of said plurality of parallelograms to one of said plurality of spaced members disposed within the center of each of said plurality of parallelograms.

11. The can tray system of claim 2 wherein said strut means includes longitudinal and lateral spaced member struts directly connecting longitudinally and laterally adjacent spaced members, respectively.

12. The can tray system of claim 1 wherein said tray is formed by injection molding.

13. The can tray system of claim 1 wherein said spaced members are disposed between adjacent said cans of said bottom layer of cans and extend below said rims of said cans when said tray is in said blocked position on said bottom layer of cans.

14. The can tray system of claim 1 wherein at least some of said spaced members are disposed adjacent to at least two edges of said tray.

15. The can tray system of claim 1 wherein at least some of said spaced members are disposed in corners of said bottom floor surface.

16. The can tray system of claim 1 wherein said floor structure has a floor perimeter set in from and extending below outer surfaces of said walls so that said floor structure can nest down and within the top of a similar said tray therebeneath when said tray therebeneath is empty.

17. The can tray system of claim 1 wherein each of said cans in said bottom and top layers of cans is made of metal, includes a generally cylindrical-shaped body, and has a bottom chine.

18. The can tray system of claim 17 wherein each of said top rims are integrally formed with said bodies.

19. The can tray system of claim 1 wherein each of said cans further includes a top can closure disposed generally within said top rim.

20. The can tray system of claim 19 wherein each of said cans is a pull-top aluminum beverage can.

21. The can tray system of claim 1 wherein said top floor surface defines a smooth and generally unobstructed surface across generally the entire expanse thereof.

22. The can tray system of claim 1 wherein said tray is made of plastic.

23. The can tray system of claim 1 wherein said spaced members each having a generally curved perimeter surface.

24. The can tray system of claim 23 wherein said spaced members each define a generally quadrilateral shape with four rounded corners and four sides connected to said corners and curving inwardly at the middles thereof.

25. The can tray system of claim 1 wherein each of said spaced members includes a bottom surface having a bevelled edge about generally the entire perimeter thereof such that said floor structure when in the blocked position on said bottom layer of cans can be rotated relative to said bottom layer of cans on said bevelled edges to reach the unblocked position and slidingly moved relative to said bottom layer of cans on said bottom surfaces of said spaced members.

26. The can tray system of claim 1 wherein said walls include end walls having a width generally corresponding to the diameter of four of said cans of said top layer and side walls having a length generally corresponding to the diameter of six of said cans of said top layer.

27. The can tray system of claim 26 wherein said end and side walls are solid and thereby define a planar surface extending around the entire periphery of said tray.

28. The can tray system of claim 1 wherein said floor structure further includes a central longitudinal strut extending the full length of said floor structure and a central lateral strut extending the full width of said floor structure.

29. The can tray system of claim 28 wherein one of said spaced members is disposed at the intersection of said central longitudinal strut and said central lateral strut such that a center spaced member is thereby defined.

30. The can tray system of claim 29 wherein said center spaced member is solid and has a planar surface extending across the entire expanse thereof.

31. The can tray system of claim 30 wherein at least some of said spaced members have generally open center surfaces.

32. The can tray system of claim 28 wherein some of said spaced members are formed on said central longitudinal strut and some of said spaced members are formed on said central lateral strut.

33. The can tray system of claim 1 wherein said spaced members depend below the top of said rims of said bottom layer when said tray is in the blocked position on said bottom layer of cans.

34. The can tray system of claim 1 wherein each of said cans is loose and disconnected from an adjacent one of said cans.

35. The can tray system of claim 1 wherein said tray defines a top tray and further including a bottom tray for containing said bottom layer of cans, said bottom tray having walls joined together to thereby define a generally rectangular wall structure, said bottom tray including a bottom floor structure secured to and positioned generally within said wall structure, and said bottom floor structure having a bottom floor surface and a top floor surface.

36. The can tray system of claim 1 wherein said spaced members are generally diamond-shaped.

37. The can tray system of claim 36 wherein said diamond-shaped spaced members have concave arcuate sides.

38. The can tray system of claim 1 wherein said tray is nestable within a corresponding said tray therebeneath.

39. The can tray system of claim 38 wherein at least one of said floor structure and said wall structure forms a nesting tab means for preventing wedging of said tray within the corresponding said tray therebeneath.

40. The can tray system of claim 39 wherein said nesting tab means includes said floor structure having a floor perimeter set in form and extending below said wall structure so that said floor structure can nest down and within the top of a corresponding wall structure of another said tray therebeneath and said wall structure thereby prevents wedging of said trays.

41. A stackable and nestable can tray comprising:
interconnected front and rear walls, and end walls for containing cans therewithin;
said front and rear walls and said end walls having length dimensions related by a 3:2 ratio;
an open gridwork floor connected to said front and rear walls and said end walls, said open gridwork floor having a bottom surface and an upper can supporting surface;
said open gridwork floor including a plurality of rings and interconnecting strut means;
said open gridwork floor further including a central transverse strut extending from one of said end walls to the other of said end walls at central locations thereof and a central longitudinal strut extending from said front wall to said rear wall at central locations thereof; and
a plurality of standoffs projecting downwardly from said tray bottom for engaging can tops of cans in a subjacent can tray and for limiting lateral movement of said tray relative to the can tops;
wherein said standoffs are configured and positioned such that when a generally lateral force is exerted on at least one of said walls, at least some of said standoffs are repositioned relative to the can tops therebeneath such that said tray is in a generally unblocked position relative thereto and said tray can slide on the can tops of cans in the subjacent can tray.

42. The stackable and nestable tray of claim 41 further comprising a plurality of support posts positioned on interior surfaces of said walls.

43. The stackable and nestable tray of claim 42 wherein said support posts form bulging wall portions on said front and rear walls.

44. The stackable and nestable tray of claim 41 wherein said standoffs have a generally diamond-shaped configuration with plural concave arcuate side surfaces.

45. The can tray of claim 1 wherein said spaced members are disposed above the top of said rims of said bottom layer when said tray is in the unblocked position on said bottom layer of cans.

46. The can tray of claim 1 wherein the unblocked position of said tray is elevated relative to the blocked position of said tray on said bottom layer of cans.

* * * * *